United States Patent [19]

Johnson

[11] 4,232,986

[45] Nov. 11, 1980

[54] TRAILER WITH MULTIPLE BALE ELEVATING APPARATUS AND METHOD OF BALE HANDLING

[76] Inventor: Howard L. Johnson, 4500 NW. 108th St., Kansas City, Mo. 64154

[21] Appl. No.: 946,819

[22] Filed: Sep. 28, 1978

[51] Int. Cl.³ .............................................. B60P 1/38
[52] U.S. Cl. .................................... 414/24.5; 414/495
[58] Field of Search ...................... 414/24.5, 24.6, 44, 414/92, 95, 111, 495, 501; 187/17, 20

[56] References Cited

U.S. PATENT DOCUMENTS

| | | | |
|---|---|---|---|
| 1,573,172 | 2/1926 | Laffey | 414/495 X |
| 3,278,050 | 10/1966 | Tarbox | 414/44 |
| 3,870,334 | 3/1975 | Goff | 414/495 X |
| 3,918,595 | 11/1975 | Godfrey | 414/44 X |
| 3,924,765 | 12/1975 | Hostetler | 414/24.6 |
| 3,942,666 | 3/1976 | Pfremmer | 414/501 |
| 3,951,288 | 4/1976 | Hale | 414/24.5 |
| 4,042,140 | 8/1977 | McFarland | 414/24.6 |
| 4,044,963 | 8/1977 | Hostetler | 414/24.5 |
| 4,072,241 | 2/1978 | Parker | 414/24.5 |
| 4,076,138 | 2/1978 | Honomichl | 414/24.5 |

FOREIGN PATENT DOCUMENTS 2331868  1/1975  Fed. Rep. of Germany ............. 414/95

OTHER PUBLICATIONS

Brochure, The Binkley Company, Warrenton, Mo., undated.
GP, Incorporated (Rural Route 1 Moran, Kansas 66755) Brochure.

Primary Examiner—Stephen G. Kunin
Assistant Examiner—Terrance L. Siemens
Attorney, Agent, or Firm—Fishburn, Gold and Litman

[57] ABSTRACT

A method for handling large cylindrical bales includes loading a first group of bales on an elongated trailer, elevating the bales, loading a second group of bales on the trailer, and lowering the first group of bales onto the second group for stable transportation of a relatively large number of bales. An apparatus for carrying out such a method includes the trailer having a conveyor extending therealong, a loader device on the trailer for engaging bales on the ground and depositing the same on the conveyor, bale supporting platform sections extending along the conveyor, drive shafts with sprockets thereon rotatably supported on the trailer and extending along the top side of the trailer, drive chains connected to the platform section and engaging the sprockets, and a motor operatively connected to shafts to rotate same and thereby effect elevation of the bales supported by the platform sections.

6 Claims, 13 Drawing Figures

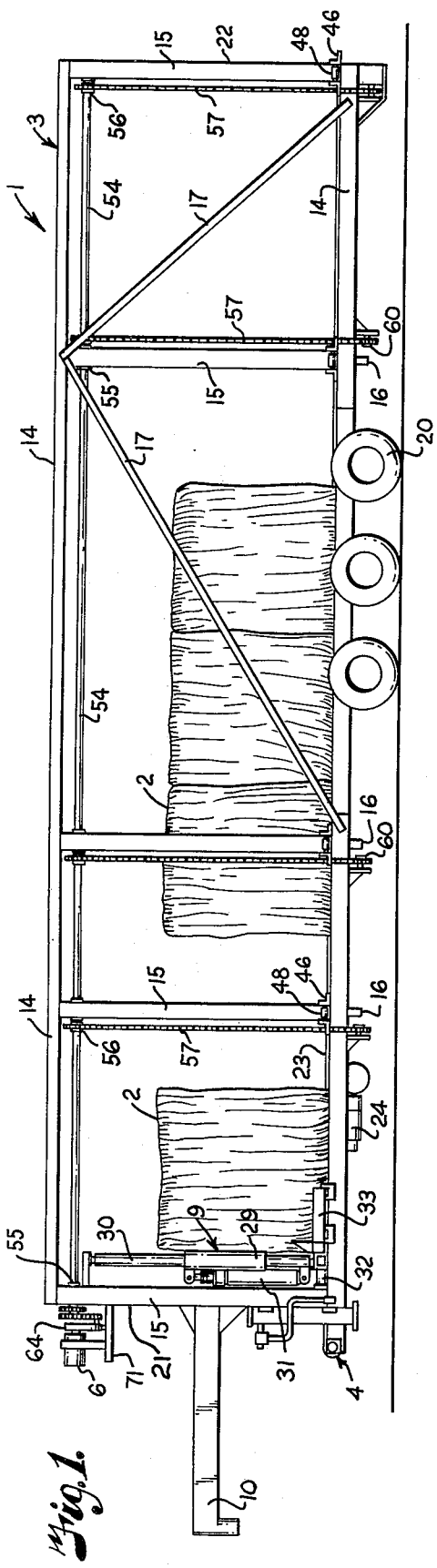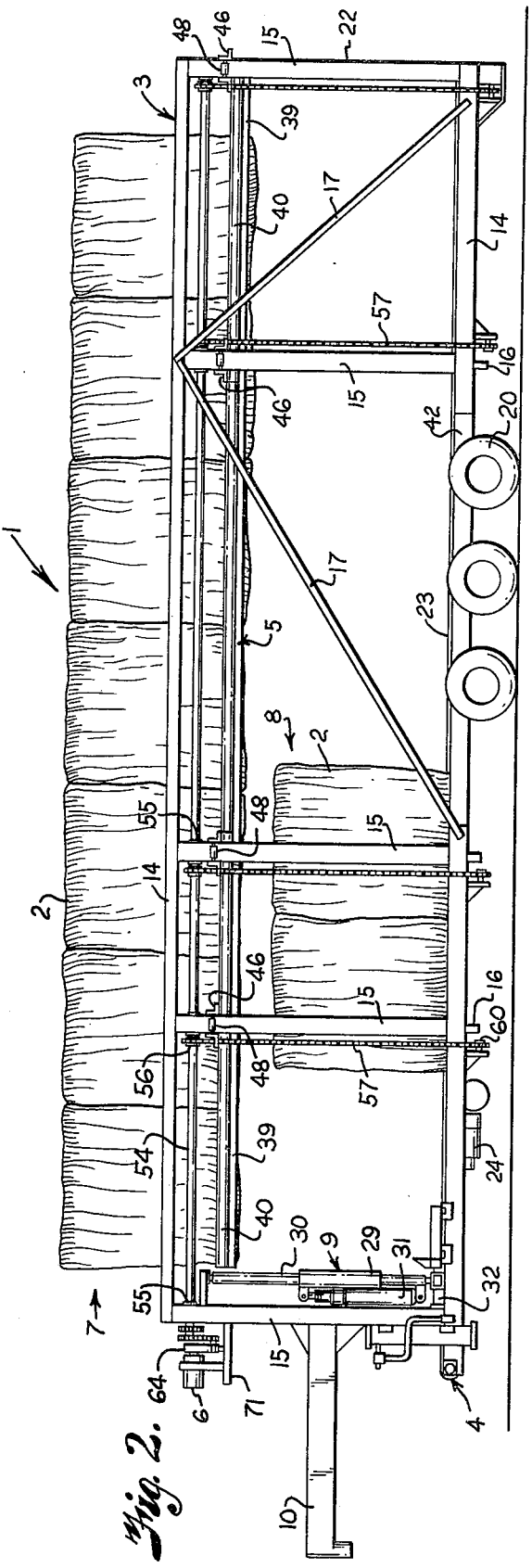

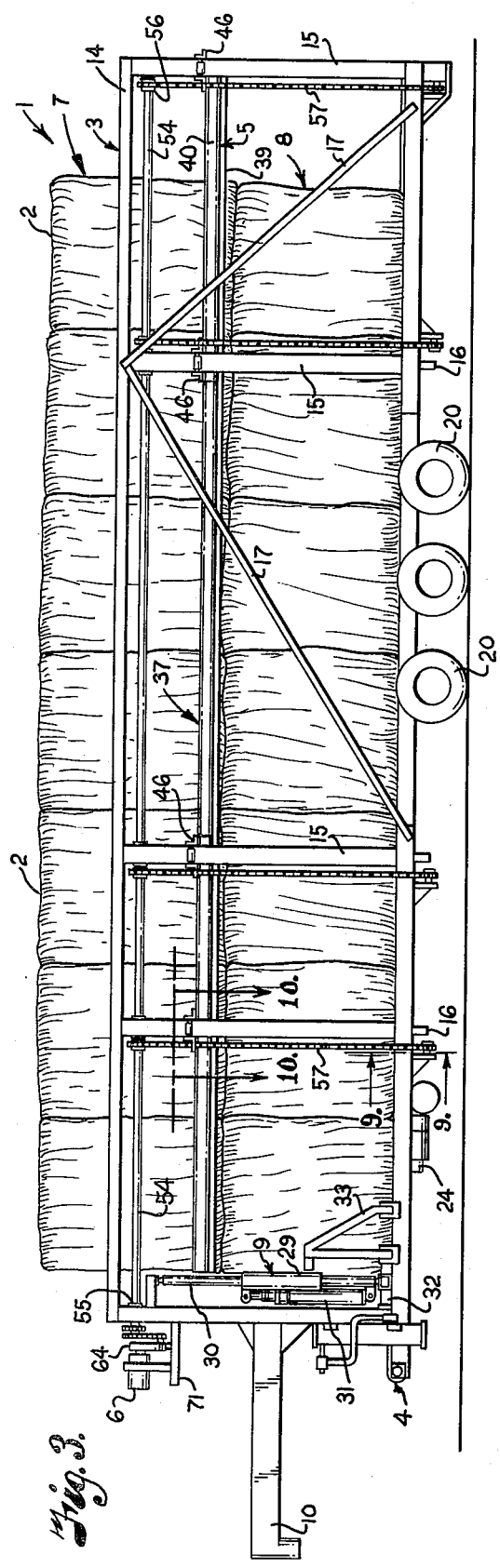
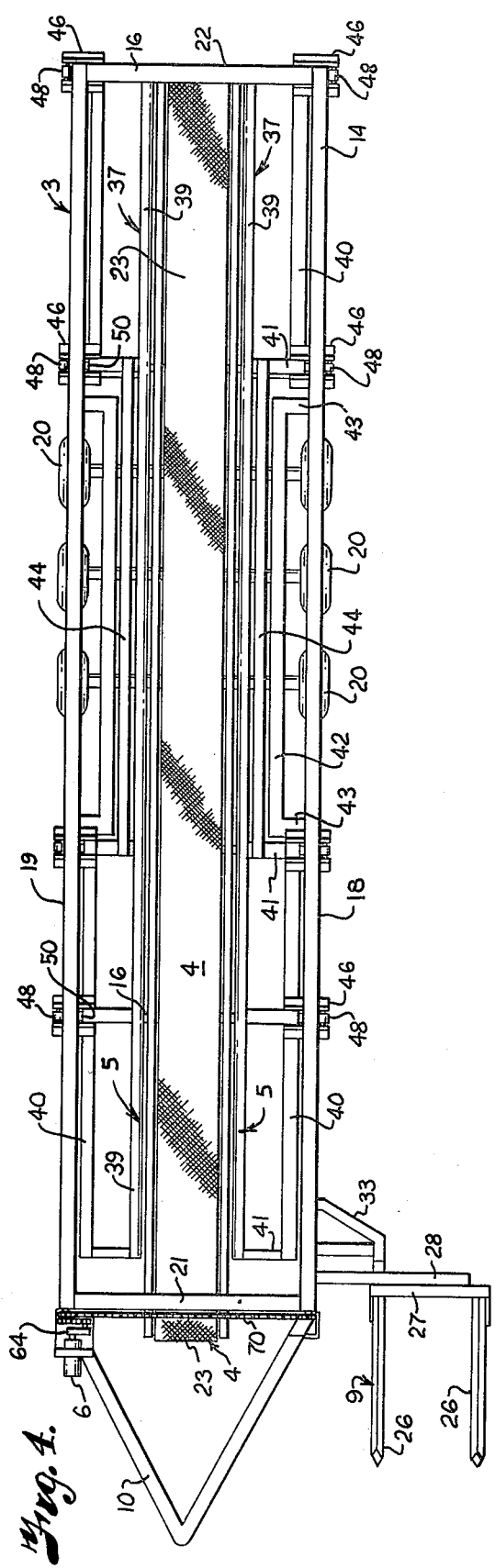

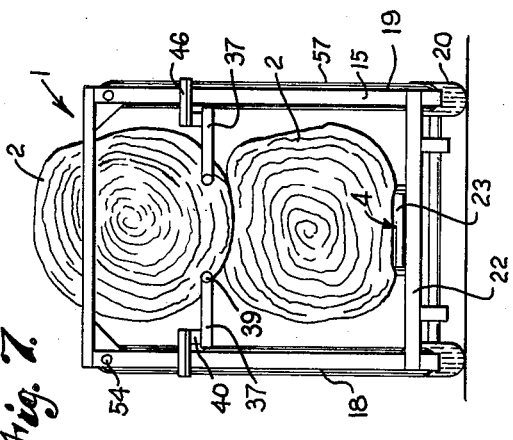
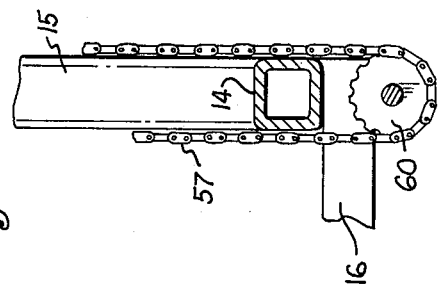
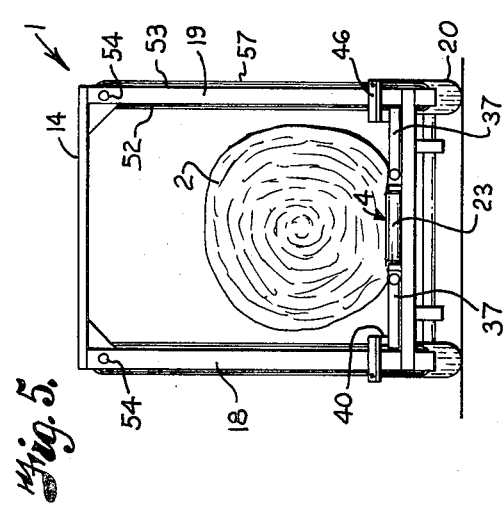
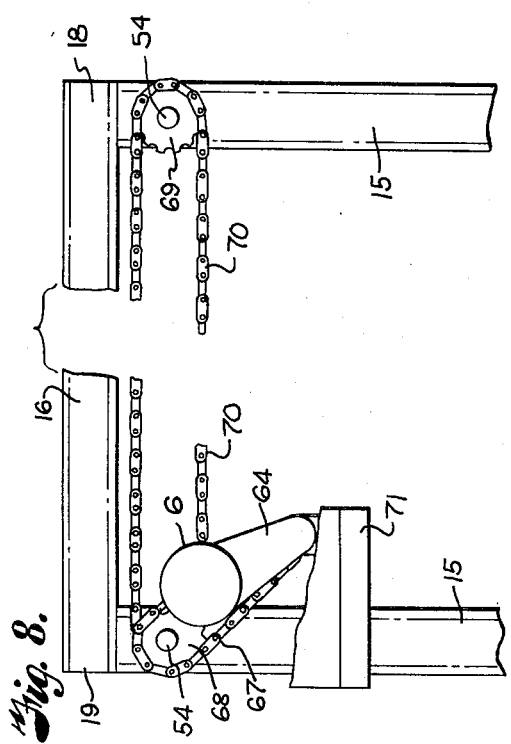

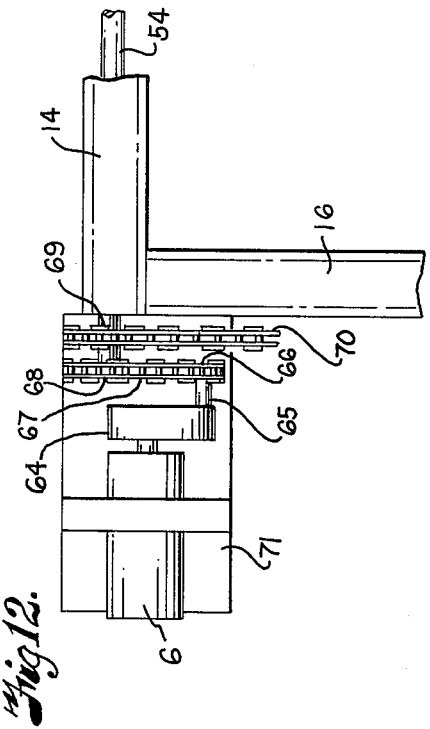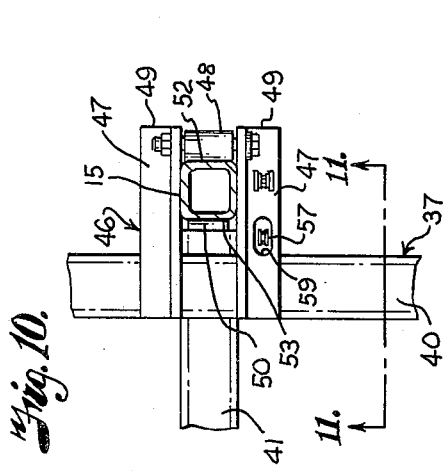

TRAILER WITH MULTIPLE BALE ELEVATING APPARATUS AND METHOD OF BALE HANDLING

The present invention relates to the handling of large round bales and more particularly to a self-loading bale handling trailer for carrying a stack of such bales by elevating one row thereon and depositing same on a second row thereof.

One of the limitations to the number of large round bales of hay that can be transported at one time is the length limitation required by law for trailers on the highway. Trailers have heretofore been limited to the length of a single row of bales together with a loading mechanism and a hitch structure.

The trailer of the present invention overcomes this limitation in a self-loading trailer with means to elevate one row of bales and set them on top of a second row.

The principal objects of the present invention are: to provide a method for transporting a greater number of large round bales than has previously been feasible in a selfloading bale trailer for highway use; to provide an apparatus for carrying out such a method comprising a self-loading bale trailer with an elevatable bale platform; to provide such a trailer including a loading device for loading bales from the side of the trailer near the front thereof for good visibility during loading; to provide such a trailer having a hydraulically actuated elevating mechanism including longitudinally extending shafts with sprockets thereon, the sprockets having chains engaged therewith and connected to bale support platform sections extending along a conveyor on the trailer; and to provide such a bale-handling trailer which is economical to manufacture, durable and efficient in operation, and which is particularly well adapted for its intended purpose.

Other objects and advantages will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features of the trailer with multiple bale elevating apparatus.

FIG. 1 is a side elevational view of the self-loading multiple bale trailer with a plurality of bales shown positioned along a conveyor thereof.

FIG. 2 is a view similar to FIG. 1 and shows a first plurality of bales elevated to allow a second plurality of bales to be positioned on the conveyor.

FIG. 3 is a view similar to FIG. 1 and shows a first plurality of bales positioned on top of a second plurality of bales on the conveyor and in condition for highway transportation of the trailer.

FIG. 4 is a top plan view of the trailer and illustrates details of the elevator platform sectons for supporting the elevated bales.

FIG. 5 is a rear end elevational view of the trailer with a bale shown positioned on the conveyor.

FIG. 6 is a view similar to FIG. 5 and shows a bale elevated for clearance of a bale on the conveyor therebelow.

FIG. 7 is a view similar to FIG. 5 and illustrates an elevated bale lowered onto a bale on the conveyor.

FIG. 8 is an enlarged fragmentary front end elevational view of the trailer and illustrates details of a motor and chains connecting the elevating shafts of the trailer.

FIG. 9 is an enlarged fragmentary transverse sectional view taken along line 9—9 of FIG. 3 and illustrates a lower idler sprocket associated with the lifting chains.

FIG. 10 is an enlarged fragmentary horizontal sectional view taken along line 10—10 of FIG. 3 and illustrates a guide mechanism connected to one of the elevator platform sections and engaging one of the vertical members of the trailer frame.

FIG. 11 is a transverse sectional view taken along line 11—11 of FIG. 10 and illustrates additional details of the guide mechanism and the connection of a lifting chain thereto.

FIG. 12 is an enlarged fragmentary top plan view showing details of the elevating motor and the connection thereof to one of the elevating shafts.

FIG. 13 is an enlarged fragmentary side elevational view and illustrates further the details of the motor and connection thereof to one of the elevating shafts.

Referring to the drawings in more detail:

The reference numeral 1 generally designates a trailer with multiple bale elevating apparatus thereon for arranging large cylindrical bales 2 in a double tier stack for transportation thereof. The trailer 1 includes an elongated trailer frame 3 with a conveyor 4 (See FIG. 4) extending along a bed thereof, an elevator platform 5, and a motor 6 operatively coupled thereto and cooperating therewith to elevate a first plurality 7 of the bales to allow a second plurality 8 to be loaded onto the conveyor 4 below the first plurality, whereby a large number of the bales 2 may be safely and efficiently transported at one time. Preferably, the trailer 1 includes a loading device 9 operable to engage a bale from a ground position and deposit same onto the conveyor 4. The trailer 1 further includes a hitch structure 10 for connection of the trailer 1 to a towing vehicle (not shown).

The trailer frame 3 is constructed from longitudinal members 14, standards or vertical members 15, cross members 16, and braces 17 joined to form a sturdy structure capable of supporting a plurality of the bales 2 which normally weigh about 1500 pounds each. The standards 15 are spaced longitudinally along the opposite sides 18 and 19 of the trailer frame 3 which is provided with ground engaging wheels 20.

The conveyor 4 may take any form suitable to position the bales 2 along the trailer frame 3. In the illustrated trailer 1, the conveyor 4 is of the belt type and extends from the front end 21 to the rear end 22 of the frame 3. Preferably, the belt 23 is relatively smooth in order to prevent damage to the bales conveyed thereby and to allow selective slippage between the belt 23 and bales thereon so that the bales may be positioned closely on the conveyor 4. The conveyor 4 includes a driving motor 24 connected to a driving roller (not shown) frictionally engaged by the belt 23.

The trailer 1 may be loaded by means of a loading device on a separate vehicle; however, it is preferable for the trailer 1 to be self-loading, if the loading device does not take up too much space on the trailer. The illustrated loading device 9, which is more fully described in my co-pending application entitled "Self-loading Multiple Bale Trailer", includes a bale engaging member, such as the tines or legs 26, supported by a frame 27 connected by arms 28 to a non-round sleeve 29 slidable on a similarly shaped guide shaft 30. An hydraulic cylinder 31 provides lifting power for moving the sleeve 29 along the shaft 30. The shaft 30 is mounted for rotation about a vertical axis and is rotated by a rotation motor 32.

The loading device 9 is operable to engage a bale 2 on the ground during forward movement of the trailer 1 (with the loader 9 in the position illustrated in FIG. 4), rotate the bale about the vertical axis of the shaft 30, and deposit the bale onto the conveyor 4. Throughout the loading procedure, the rotational orientation, particularly the original down side of the bale 2, is maintained to thereby limit spoilage of the hay in the bale. As each bale is loaded, previously loaded bales are conveyed into contact therewith, with the belt 23 slipping relative to the just-loaded bale 2, in order to closely pack the bales along the conveyor 4. When the last bale has been loaded, the loading device 9 remains in a retracted position within the frame 3, whereby the loading device 9 does not take up unnecessary bale storage space on the trailer. The trailer 1 may include means such as a stop bracket 33 for contact by the loading device 9 during bale engagement to resist undesired rotation thereof during bale engagement.

The elevator platform 5 may take any form compatible with the type of conveyor and lifting means employed. With reference to FIG. 4, the preferred platform 5 includes a pair of platform sections 37 extending alongside the opposite sides of the conveyor 4. Each section 37 includes a substantially continuous inner longitudinal member 39 and several outer longitudinal members 40 connected by cross members 41 to the longitudinal member 40. The wheels 20 are inset on the frame 3, and the frame 3 includes inset longitudinal members 42 connected by short crosspieces 43 to main longitudinal members 14 of the frame 3. The platform sections 37 are, therefore, constructed to fit around the portion of the frame 3 inset for the wheels; and each platform section includes an inset longitudinal member 44 connected to the cross members 41. Alternatively, on a trailer without inset wheels, the platform members 37 could be constructed with the outer members 40 substantially continuous. However, the form illustrated in FIG. 4 allows maximum usable bale storage space on a vehicle with minimal width.

The platform sections 37 include guide means 46 for maintaining the substantially horizontal orientation thereof by resisting rotation of the sections 37 under the weight of the bales 2 thereon during elevation. With reference to FIGS. 10 and 11, the illustrated guide means 46 includes a pair of arms, such as angles 47, attached on one of the longitudinal members 40 of the platform section 37 with the standard 15 passing therebetween. A first roller 48 is rotatably mounted between the outer ends 49 of the angles 47, and a second roller 50 is rotatably mounted on the outer end of one of the cross members 41 of the section 37. The respective axes of the rollers 48 and 50 are spaced apart diagonally and engage respective lateral sides 52 and 53 of the standard 15. As viewed in FIG. 11, the weight of the bale 2, concentrated along the member 39, tends to rotate the platform section 37 in a counterclockwise direction. However, the rotation is resisted by the rollers 48 and 50 in rolling contact with the sides 52 and 53 of the standard 15.

The trailer 1 may include any suitable means for elevating the platform sections 37, and, in the illustrated embodiment, a longitudinally extending drive shaft 54 is rotatably mounted in bearing members 55 through the upper ends of the standards 15 on each side of the frame 3. Each shaft 54 includes a plurality of elevating sprockets 56 and an elevating chain 57 engaged therewith. In the illustrated trailer 1, each sprocket 56 and chain 57 is associated with a respective guide means 46. The chain 57 has one end 58 connected to one of the angles 47, passes over the elevating sprocket 56, down through an aperture 59 in the angle 47 (see FIG. 10), around an idler sprocket 60 (see FIG. 9) engaged therewith, and back up to the guide means 46 where another end 61 of the chain 57 is connected to the angle 47.

The motor 6 may be any suitable motor and is most conveniently a rotary hydraulic motor since the other motors—24, 31, and 32—are hydraulic. Referring to FIGS. 12 and 13, the motor 6 is coupled through a reduction gear mechanism 64 to an output shaft 65 thereof with a drive sprocket 66 thereon. A drive chain 67 engages the sprocket 66 and a driven sprocket 68 mounted on one of the elevating shafts 54, such as the one on the right side 19 of the frame 3. A timing sprocket 69 is mounted on each of the shafts 54, and a timing chain 70 is engaged with both of the sprockets 69 for coordinated rotation of the shafts 54. The motor 6 and reduction gear 64 may be supported by a bracket 71 mounted on the frame 3.

It will be appreciated that some other type of flexible tensile connector, such as a rope or cable engaging a pulley, could be substituted for the chain 54 and sprockets 56. However, the chains and sprockets are preferred because the chains positively engage the sprockets whereby coordination of the two shafts 54 is facilitated. Further, the shafts 54 could be supported at any height; however it is preferred that the shafts located at the top of the trailer so that the motor 6 and gearing may be mounted in a position which is not susceptible to collision with bales, other vehicles or the like. Since the shafts 54 are connected by the timing chain 70, both shafts 54 rotate in the same direction. This will entail minor differences in the connection of the elevating chains 57 to the guides 46 and locations of the apertures 59 or the opposite sides 18 and 19 of the trailer 1.

In use, the trailer 1 is hitched to a towing vehicle (not shown) and towed to the location of bale pickup. The bale platform 5 is lowered to its lowest position before loading begins, and the loading device 9 is extended outwardly as shown in FIG. 4. Bales 2 are engaged during forward motion of the trailer 1, and since the loading device 9 is located near the front of the trailer 1, the procedure can be easily monitored visually from the towing vehicle. The bale 2 on the legs 26 of the loader 9 is lifted, revolved about a vertical shaft 30, and deposited on the conveyor 4. The conveyor is activated to move the bale to a position rearward enough to allow the next bale to be loaded. As the second and each succeeding bale is loaded, the previously loaded bales are brought up into contact with the just-loaded bale, with the conveyor belt 23 slipping relative thereto, whereby the bales are positioned in end-to-end relation on the conveyor 4.

When the maximum number of bales has been loaded, the elevator motor is activated to elevate the first plurality 7 of bales to a height permitting a second plurality 8 of bales to be loaded onto the conveyor 4 (see FIG. 2). When the last bale of the second plurality 8 has been deposited on the conveyor 4, the motor 6 is again activated to lower the first plurality 7 onto the second plurality (see FIG. 3). The trailer is then fully loaded, and may be towed in a relatively stable condition and, if on the highway, legally to a location of storage or consumption of the bales 2.

To off-load the bales 2, the first plurality 7 is elevated, while the second plurality 8 is off-loaded either by conveying the bales off the rear end 22 of the trailer or by use of the loading device 9. When the second plurality 8 has been off-loaded, the first plurality 7 may be lowered and off-loaded.

While certain forms of the present invention have been described and illustrated, it is not to be limited thereto except insofar as such limitations are included in the following claims.

What I claim and desire to secure by Letters Patent is:

1. A multiple bale handling apparatus comprising:
   (a) an elongated mobile frame;
   (b) conveyor means extending along said frame, said conveyor means being capable of supporting a plurality of bales therealong;
   (c) elevator platform means extending along said frame;
   (d) elevating means mounted on said frame, connected to said platform means, and operable to elevate said platform means with a bale thereon from a position wherein said bale is resting on said conveying means to a height above said conveying means permitting additional bales to be received on said conveyor means, whereby said frame supports bales in upper and lower layers simultaneously for transport;
   (e) said platform means including a plurality of platform sections; and said elevating means including;
   (f) a plurality of shafts rotatably supported on said frame;
   (g) a sprocket on each of said shafts;
   (h) an elevating chain engaged with said sprocket and connected to one of said platform sections; and
   (i) motor means operatively coupled with said shafts and operable to rotate same thereby effecting elevation of said platform sections.

2. A multiple bale handling apparatus comprising:
   (a) an elongated mobile frame;
   (b) conveyor means extending along said frame, said conveyor means being capable of supporting a plurality of bales therealong;
   (c) elevator platform means extending along said frame;
   (d) elevating means mounted on said frame, connected to said platform means, and operable to elevate said platform means with a bale thereon from a position wherein said bale is resting on said conveying means to a height above said conveying means permitting additional bales to be received on said conveyor means, whereby said frame supports bales in upper and lower layers simultaneously for transport;
   (e) said platform means including a platform section extending along each side of said conveyor means;
   (f) said frame including at least one standard associated with each platform section, said standard including opposite side surfaces;
   (g) each platform section including guide means connected thereto, said guide means including a pair of spaced apart rollers; and
   (h) said rollers engaging respective opposite side surfaces of said standard in a manner to resist rotation of said platform section about a horizontal axis during elevation of said platform means.

3. A multiple bale handling apparatus comprising:
   (a) an elongated mobile frame;
   (b) conveyor means extending along said frame, said conveyor means being capable of supporting a plurality of bales therealong;
   (c) elevator platform means extending along said frame;
   (d) elevating means mounted on said frame, connected to said platform means, and operable to elevate said platform means with a bale thereon from a position wherein said bale is resting on said conveying means to a height above said conveying means permitting additional bales to be received on said conveyor means, whereby said frame supports bales in upper and lower layers simultaneously for transport;
   (e) said frame including a plurality of standards longitudinally spaced along opposite sides thereof;
   (f) said platform means including a pair of elongated platform sections extending respectively along opposite sides of said conveyor means; and
   (g) guide means are connected to each of said platform sections and engage respective standards to thereby maintain substantially horizontal orientation of said platform sections during elevation thereof; and said elevating means includes:
   (h) a pair of shafts rotatably supported on and extending longitudinally along respective opposite sides of said frame;
   (i) a sprocket mounted on each of said shafts;
   (j) an elevating chain associated with each shaft, engaged with the sprocket of said shaft, and connected to one of said platform sections for elevation thereof upon rotation of said sprocket; and
   (k) motor means operatively coupled with said shafts for rotation thereof to thereby effect elevation of said platform sections.

4. In a bale handling trailer for transporting large cylindrical bales and including an elongated trailer frame and bale conveyor means extending along said frame, the improvement comprising:
   (a) elevator platform means extending alongside said conveyor means;
   (b) elevating means mounted on said frame, connected to said platform means, and operable to elevate said platform means with a bale thereon to a height permitting additional bales to be received on said conveyor means below said bale on said platform means; said trailer frame including a plurality of standards spaced longitudinally along opposite sides thereof and said elevating means including;
   (c) a pair of elongated shafts rotatable supported at the upper ends of the standards extending along respective opposite sides of said trailer frame;
   (d) a plurality of elevating sprockets mounted at longitudinally spaced positions along each of said shafts;
   (e) a chain engaging each of said sprockets, each chain being operatively connected to said platform means;
   (f) a plurality of guide means mounted on said platform means, each guide means engaging a respective standard, said guide means being operative to maintain the substantially horizontal orientation of said platform means during elevation thereof; and
   (g) motor means operatively coupled to said shafts for rotation thereof to thereby effect elevation of said platform means.

5. A trailer as set forth in claim 4 wherein:
(a) each of said guide means includes a pair of spaced apart rollers;
(b) each standard engaged by one of said guide means includes a pair of opposite side surfaces; and
(c) the rollers of each guide means contact the respective side surfaces of the standard associated therewith to resist rotation of said platform means during elevation thereof.

6. A trailer as set forth in claim 4 wherein:
(a) each chain is associated with one of said guide means and includes opposite ends thereof;
(b) said trailer frame includes an idler sprocket for each chain, said idler sprocket being rotatably mounted and vertically aligned with a respective elevating sprocket; and
(c) said chain engages said idler sprocket and said respective elevating sprocket, and the opposite ends of said chain are connected to said one of said guide means.